United States Patent [19]

Nedelec et al.

[11] Patent Number: 5,387,364
[45] Date of Patent: Feb. 7, 1995

[54] METHOD OF CONTROLLING FOAM

[75] Inventors: Beatrice Nedelec, Chaville, France; Franck A. D. Renauld, Gistoux; George C. Sawicki, Rixensart, both of Belgium

[73] Assignee: Dow Corning S.A., Seneffe, Belgium

[21] Appl. No.: 81,719

[22] Filed: Jun. 25, 1993

[30] Foreign Application Priority Data

Jul. 9, 1992 [GB] United Kingdom ............... 9214569

[51] Int. Cl.$^6$ ............................................. C11D 1/82
[52] U.S. Cl. ................................. 252/174.15; 252/352
[58] Field of Search ........................... 252/174.15, 352

[56] References Cited

U.S. PATENT DOCUMENTS

| | | | |
|---|---|---|---|
| 3,756,052 | 9/1973 | Quaal et al. | 72/42 |
| 4,514,319 | 4/1985 | Kulkarni et al. | 252/321 |
| 4,515,704 | 5/1985 | Akred et al. | 252/174.15 X |
| 4,618,446 | 10/1986 | Haslop et al. | 252/174.15 X |
| 4,749,732 | 6/1988 | Kohl et al. | 252/174.15 X |
| 4,793,943 | 12/1988 | Haslop et al. | 252/174.15 X |
| 5,017,221 | 5/1991 | Legrow et al. | 106/2 |
| 5,045,225 | 9/1991 | Aronson et al. | 252/174 |

*Primary Examiner*—Paul F. Shaver
*Attorney, Agent, or Firm*—Timothy J. Troy

[57] ABSTRACT

Foam in an environment with free surface turbulence is controlled with a foam control agent which comprises (A) 5 to 90 parts by weight of an organopolysiloxane having at least 40% siloxane units with a substituent $-Z_z-R'$ wherein $R'$ is a $C_{9-35}$ alkyl group, $Z$ is a linking group with silicon and $z$ is 0 or 1, provided more than 70% by weight of its carbon content is due to the groups $-Z_z-R'$, (B) 0.1 to 30 parts by weight of a finely divided hydrophobic particulate material, (C) 5 to 95 parts by weight of a hydrocarbon oil and (D) 0 to 20 parts by weight of an organosilicon MQ resin.

17 Claims, No Drawings

METHOD OF CONTROLLING FOAM

The present invention relates to a method of controlling foam. More specifically the present invention relates to a method of controlling foam in high turbulence systems, using a foam control agent which is based on hydrocarbon oils, in combination with organopolysiloxanes having higher alkyl groups substituted on some of the silicon atoms.

Foam control agents which are based on organopolysiloxanes have been known for a long time and have found applications in a large number of industries, e.g. detergent industry, textile industry and paper industry. A large number of organopolysiloxane based foam control agents use polydimethylsiloxanes which are end-blocked by trimethylsilyl groups. Much research has gone into improving such foam control agents with varying measures of success. However, foam control agents which are based purely on organopolysiloxanes as the liquid ingredient are expensive and there is a need to find effective but cheaper foam control agents.

An acceptable and known way of cheapening foam control agents is by including hydrocarbon oils in them. Certain types of hydrocarbonsilicone copolymers have been suggested in U.S. Pat. No. 4,514,319 for the improvement of the antifoaming ability of compositions based on hydrocarbon oils as the anti-foam vehicle, particularly mineral oil. In said specification there is disclosed a hydrocarbon oil based silicone antifoam composition which comprises from 1 to 60 weight percent of a hydrocarbonsilicone copolymer, from 1 to 20 weight percent of a hydrophobic filler having a certain average particle size, from 20 to 97 weight percent of a hydrocarbon carrier oil and optionally an organosilicone surfactant and a silicone oil. The hydrocarbonsilicone copolymer may be a random copolymer or a block copolymer, but has to fulfil the condition that the %$CH_2$ content is in the range of about 30% to about 70%. This condition has to be fulfilled in order to ensure that the hydrocarbonsilicone is soluble in the hydrocarbon carrier oil and that there is sufficient surface activity at the oil/air interface to decrease the surface tension at low concentrations, and thus spread on a surfactant solution of 0.5% aqueous solution of sodium dodecyl sulphate. This $CH_2$% is not clearly defined in the specification but, from the examples, can be read as meaning the number percentage of $CH_2$ groups which are present in the larger hydrocarbon substituents based on the total number of carbon atoms present in the copolymer. Hydrocarbonsilicone copolymers with a %$CH_2$ which is lower than 30%, or higher than 70%, have been disclosed but do not improve the performance of the hydrocarbon oil based antifoam.

A different type of siloxane has been suggested in E.P. Specification 397 297 for use in combination with hydrocarbon oils and finely divided filler particles. The siloxane materials are alkylaminosilicones wherein at least one silicon atom is substituted with an amino containing group which has a $C_{6-50}$ hydrocarbon radical linked directly to a nitrogen atom. These materials are alkylaminosilicones wherein at least one silicon atom is substituted with an amino containing group which has a $C_{6-50}$ hydrocarbon radical linked directly to a nitrogen atom. These materials are stated only to be useful if similar conditions are fulfilled to those required of the hydrocarbon silicon copolymers of U.S. Pat. No. 4,514,319. This means that the alkylaminosilicones have to be soluble in hydrocarbon oils and still possess excellent surface activity. These conditions are stated to be fulfilled if the alkylaminosilicones have a methylene content of at least 1% by weight, preferably 5 to 10%, and if they exert a surface tension lowering on the hydrocarbon oils of at least 5 dynes/cm. The test applied in said patent specification if the $CH_2$ content (calculated as number of methylene groups over the sum of methylene groups and methyl groups $\times 100$) is from 45 to 90%, most preferably from 50 to 75% and if the resulting mixture of the silicone with mineral oil spreads over a 0.5% by weight solution of sodium dodecylsulphate in water.

We have now surprisingly found that the use of foam control agents based on hydrocarbon oils and organopolysiloxanes which have a certain amount of higher alkyl groups linked to silicon atoms are particularly useful for controlling foam in aqueous surfactant systems which are subject to free surface turbulence. This is surprising, as these organopolysiloxane materials do not spread on an aqueous solution of 0.5% by weight of sodium dodecylsulphate and are therefore traditionally regarded as unsuitable for antifoaming purposes.

According to a first aspect of the invention there is provided a method of controlling foam levels of aqueous surfactant compositions in an environment with free surface turbulence which comprises adding to the aqueous surfactant composition a foam control agent, which comprises (A) from 5 to 90 parts by weight of an organopolysiloxane of which the siloxane units consist essentially for 0 to 60% of units of the general formula (i)

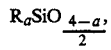

wherein R denotes a hydrocarbon group having up to 8 carbon atoms and a has a value of from 0 to 3, and for 40 to 100% of units of the general formula (ii)

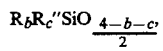

wherein R" denotes a group —$Z_z$—R', wherein R' denotes an alkyl group having from 9 to 35 carbon atoms, Z denotes a linking group between silicon and R' and z has a value of 0 or 1, b has a value of 0, 1 or 2, c has a value of 1 or 2 and b+c has a value of 1, 2 or 3, provided more than 70% by weight of the carbon content of the organopolysiloxane is due to the groups R", (B) from 0.1 to 30 parts by weight of a finely divided hydrophobic particulate material, (C) from 5 to 95 parts by weight of a hydrocarbon oil and (D) from 0 to 20 parts by weight of an organosilicon resin consisting essentially of triorganosiloxane groups and $SiO_{4/2}$ groups.

With the expression 'environment with free surface turbulence' is meant an environment in which an aqueous surfactant solution undergoes agitation, be it mechanically or otherwise, which causes mixing of gas and liquid at the liquid/gas interface and entrainment of the one phase into the other. In one embodiment this agitation forces at least some of the liquid of the surfactant solution above the gas/liquid interface. This liquid then falls back onto the surface of the liquid, which may cause foam to be generated. In an alternative embodiment liquid is introduced from above the interfacial surface into the bulk. Examples of environments which are subject to free surface turbulence are front loading washing machines where the rotation of the drum causes the detergent liquor to be forced up and to fall back onto the surface; partially submerged jet dying systems, where the high speed jet causes the rotation of a fibre and the inevitable entrainment of air at the surface of the dye liquor, followed by the formation of foam where decompression occurs at the exit of the jet and possibly also where the fibre returns into the liquor and eventually along the complete surface area; fountains; high speed sparging. Examples of environments where free surface turbulence does not take place include low speed sparging, top loading washing machines with a simple and slow agitation system and slow speed mixing systems, especially where higher viscosity liquids are mixed.

Some organopolysiloxanes which are useful as Component (A) in the present invention are known materials and have been described in a number of publications. For example U.S. Pat. No. 3,756,052 describes a metal working lubricant in which an organopolysiloxane is used which has the formula

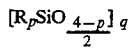

in which R is selected from monovalent hydrocarbon or halohydrocarbon groups having from 1 to 19 carbon atoms, at least 30% of the R substituents being alkyl radicals containing from 8 to 18 carbon atoms. In U.S. Pat. No. 5,017,221 there is described an emulsion, which is useful as a protective coating for surfaces such as rubber, which comprises polymethylalkylsiloxane having the general formula

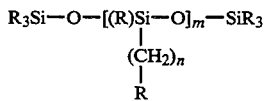

wherein R is methyl, m is an integer from 1 to 3000 and n is an integer from 1 to 10.

Polydiorganosiloxanes (A) which are useful in the composition for use in the method of the present invention have at least units of the formula (ii), although they may also have some units of formula (i). Preferred organopolysiloxanes are those where from 40 to 100% of all units are units of formula (ii), more preferably 60 to 100%. It is also preferred that the value of a in formula (i) and the value of b+c in formula (ii) is 2 for the majority of units, making the organopolysiloxane (A) predominantly a polydiorganosiloxane with a linear structure.

In the preferred organopolysiloxanes the linear polymer is end-capped with units wherein a or b+c has a value of 3. It is, however, also possible that one of the substituents of the terminal silicon atoms in the preferred organopolysiloxanes is a hydroxyl group or an alkoxy group having 1 to 6 carbon atoms. Thus preferred organopolysiloxanes are polydiorganosiloxanes with the general structure

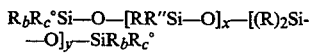

wherein R and R'' are as defined above, R° denotes either a group R or a group R'', b and c are as defined above and x and y each independently denote an integer. The values of x and y are not crucial in these preferred organopolysiloxanes. They may range from 0 to many hundreds, giving polymers with a viscosity which may be very low or very high, even up to many thousands of mm²/s. It is required, however, that the molecule fulfils the conditions set out above with regard to the number of units having a group R''. Preferred, however, are those polymers where the total chain length (x+y+2) includes from about 40 to about 500 units, most preferably 60 to 400 units.

It is also required that the organopolysiloxanes have a carbon content whereof more than 70% by weight is due to presence of groups R''. More preferably the carbon content attributed to the groups R'' is at least 75%, most preferably from 80 to 90% by weight. This can be achieved by several means. It is possible to use R' groups which are long chain alkyl groups. Alternatively, or in conjunction, it is possible to allow a high proportion of units of formula (ii) in the siloxane polymer.

Preferred R' groups are those which have a carbon chain of from 10 to 24, more preferably 10 to 18. Examples of suitable groups R' are dodecyl, tetradecyl, octadecyl and eicosyl. The groups R denote hydrocarbon groups with up to 8 carbon atoms. These may be for example alkyl, aryl, alkenyl, alkylaryl, arylalkyl or alkynyl groups. Preferably at least 50% of all R groups are alkyl groups, more preferably at least 80%. It is particularly preferred that the R groups are methyl or ethyl groups, most preferably methyl.

Polyorganosiloxanes (A) may be prepared by any of the known methods. For example they may be formed by hydrolysing silanes which have two hydrolysable groups and one group R and one group R' as silicon-bonded substituents. Alternatively they may be provided by reacting organopolysiloxanes which have a number of reactive groups substituted on silicon atoms with certain organic groups having higher alkyl groups. Depending on the type of group which is present on the silicon atoms, and the type of alkyl containing group with which they are reacted, the group Z may vary and may even not be present at all. For example if an organopolysiloxane has silicon-bonded hydrogen atoms which are reacted with α,β-alkenes having from 9 to 35 carbon atoms, having its olefinic unsaturation is between the first 2 carbon atoms, in the presence of a catalyst which promotes the addition reaction between Si—H and the unsaturation, resulting in the group R'' being equal to the group R' (z=0). Suitable catalysts include platinum and rhodium based complexes. Suitable alkenes include 1,2-dodecene, 1,2-octadecene and 1,2-eicosene. Although this method is preferred, resulting in each R'' group being a group R', there are many other ways of linking higher alkyl groups to a siloxane polymer. These methods are well known in the art, and include condensation of a silanol group with an alcoholic group, a silicon-bonded hydrogen atom with an alcoholic group or a silanol group with an ether, all resulting in Z being an oxygen link. Other reactions include silanol groups or alkoxy substituted silicon atoms with carboxylic acids or epoxides, amino functional siloxanes with epoxy functional organic groups or lactones and alkenyl functional silicone with a mercapto group. The resulting group Z may therefore be one of a number of divalent linking groups, consisting of O or C, H and optionally O, N, S or P atoms or C, H, O and optionally N, S or P atoms. Oxygen, when present, would be in the form of an ether oxygen, an ester oxygen or a substituted hydroxyl or alkoxy group. Nitrogen, when present, would be in the form of amino groups, or if present with oxygen, in the form of an amido group. Suitable examples of Z groups include alkylene-ester groups, alkylene ether groups, amide groups, polyamino/amido groups and mercapto groups, for example

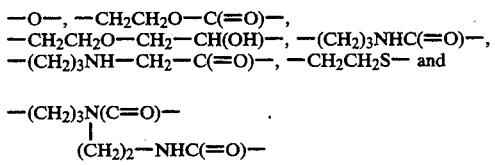

Component (B) is a finely divided hydrophobic particulate material. Suitable particulate materials are well known in the art of foam control and include e.g. silica, titania, alumina, ground quartz, magnesium oxide, zinc oxide, salts of aliphatic carboxylic acids, e.g. calcium or aluminium stearates, reaction products of isocyanates with certain materials, for example cyclohexylamine and alkyl amides, e.g. ethylene or methylene bis stearamide. Preferred are silica particles, especially those having an average particle size of from 0.1 to 50$\mu$, preferably from 1 to 20$\mu$ and a surface area of at least 50 $m^2/g$. These silica particles can be rendered hydrophobic e.g. by treating them with dialkylsilyl groups and/or trialkylsilyl groups either bonded directly onto the silica or by means of a silicone resin. We prefer to employ a silica the particles of which have been rendered hydrophobic with dimethyl and/or trimethyl silyl groups. Suitable silica materials include fumed silica, precipitated silica, hydrothermal silica and gel formation silica. Preferably the amount of particulate material used in the foam control agent is from 1 to 20 parts by weight, more preferably 3 to 15 parts, most preferably 5 to 8 parts. A foam control agent according to the invention may contain a mixture of different particulate materials.

Component (C) is a hydrocarbon oil which is exemplified by normal liquid hydrocarbons, e.g. tetradecane, hexadecane, branched paraffins, e.g. isooctane, complex saturated hydrocarbon liquids composed of paraffinic and naphtenic molecules commonly known as mineral oils or liquid paraffins, complex products of the distillation of petroleum having boiling points greater than 140° C., e.g. kerosene, heating oils and mineral spirits, triglyceride oils, e.g. trioleins, vegetable oils e.g. palm oil or olive oil and alkyl benzenes or other alkyl aryl compounds. Preferably these hydrocarbon oils have a viscosity of between 15 and 300 $mm^2/s$, whereof the more viscous materials are more preferred.

Component (D) is an optional ingredient in the foam control agent for use in the invention. It consists essentially, and preferably only, of monofunctional groups of the formula $R_3SiO_{\frac{1}{2}}$ and tetrafunctional groups $SiO_{4/2}$, although minor amounts of difunctional or trifunctional siloxane groups may also be present. A small number of the silicon-bonded substituents may also be hydroxyl or alkoxy groups, but this should not exceed 3% of all silicon-bonded substituents. R is as defined above but it is preferred that the group R is a lower alkyl (i.e. $C_{1-3}$) group, most preferably methyl. The ratio of monofunctional to tetrafunctional units is preferably in the range of from $\frac{1}{4}$ to 4/1, most preferably $\frac{1}{2}$ to 2/1. The presence of this ingredient tends to improve the efficiency of the foam control agent. It is accordingly preferred that Component (D) is present in an amount of from 3 to 15 parts, most preferably 5 to 10 parts by weight.

Additional optional components for the foam control agent are thickeners, e.g. polyvinyl alcohols, Al stearates, monoglycerides, triglycerides, treated silicas, petroleum jelly, paraffin waxes, microcrystalline waxes, dispersing agents, levelling agents, wetting agents, inorganic salts, viscosity regulators, preservatives, rust inhibitors, antioxidants and pH modifiers. Although they are preferably used as the only foam control agent present they may also be used in combination with other foam control agents, e.g. stearate soaps or any of the those polydiorganosiloxane materials which are well known in the art of silicone foam control agents.

It is preferred that the foam control agents comprise Components (A) and (C) in a ratio which is at least 1/1, more preferably from 1/1 to 20/1. Most preferably, Component (A) is present in an amount of from 50 to 90 parts, Component (B) from 2 to 10 parts, Component (C) from 5 to 50 parts and Component (D), when present, from 1 to 5 parts by weight. A particularly suitable foam control agent for use in the method of the invention comprises 50 parts of Component (A), 5 parts of Component (B) and 45 parts of Component (C). An alternative foam control agent comprises 75 parts of Component (A), 5 parts of Component (B) and 20 parts of Component (C).

The foam control agent may be made by simply mixing the ingredients in any order and ensuring good dispersion. Where the finely divided particulate material is already hydrophobic, no further reaction is required. Where this is not the case, making the particulate material hydrophobic may be done in situ, e.g. by heating the mixture where the hydrophobing agent is added. Where an unwanted byproduct is generated, e.g. water or ammonia, as the result of e.g. condensation reactions between the agent and the particulate material, these byproducts are preferably removed, e.g. by heating under reduced pressure.

A foam control agent may be used in the method according to the invention in its pure form or in an emulsified or dispersed form, e.g. a self-dispersible form. Emulsions are particularly useful where the foam control agent has to be stored in an aqueous system, e.g. a liquid detergent composition. Emulsification may be done according to standard and well-known methods.

The method according to the invention applies to a number of different applications where foam is generated in an aqueous system under a high turbulence environment, i.e. an environment with free surface turbulence, as defined above. Examples include front-loading washing machines, partially submerged jet dying system, high speed mixing systems, liquors of paper manufacturing systems, textile dying baths, food processing systems and detergent washing liquors. Foam control agents which are useful in the method of the invention may be incorporated in e.g. detergent compositions, prior to their use. It is, however, advisable that for storage stability the foam control agent would be encapsulated or protected according to any one of the methods known in the art and described in the patent literature.

The present invention also provides in another of its aspects a detergent composition in powder form, comprising the detergent component in a proportion of from 0.02 to 25% by weight based on the total detergent composition. Preferably foam control agents are added in a proportion of from 0.05 to 5% by weight based on the total detergent composition.

Suitable detergent components comprise an active detergent, organic and inorganic builder salts and other additives and diluents. The active detergent may comprise organic detergent surfactants of the anionic, cationic, non-ionic or amphoteric type, or mixtures thereof. Suitable anionic organic detergent surfactants include alkali metal soaps of higher fatty acids, alkyl aryl sulphonates, for example sodium dodecyl benzene sulphonate, long chain (fatty) alcohol sulphates, olefine sulphates and sulphonates, sulphated monoglycerides, sulphated ethers, sulphosuccinates, alkane sulphonates, phosphate esters, alkyl isothionates, sucrose esters and fluorosurfactants. Suitable cationic organic detergent surfactants include alkyl-amine salts, quaternary ammonium salts, sulphonium salts and phosphonium salts. Suitable non-ionic organic surfactants include condensates of ethylene oxide with a long chain (fatty) alcohol or fatty acid, for example $C_{14-15}$ alcohol, condensed with 7 moles of ethylene oxide (Dobanol 45-7), condensates of ethylene oxide with an amine or an amide, condensation products of ethylene and propylene oxides, fatty acid alkylol amides and fatty amine oxides. Suitable amphoteric organic detergent surfactants include imidazoline compounds, alkylaminoacid salts and betaines. Examples of inorganic components are phosphates and polyphosphates, silicates, such as sodium silicates, carbonates, sulphates, oxygen releasing compounds, such as sodium perborate and other bleaching agents and zeolites. Examples of organic components are antiredeposition a detergent component and a foam control agent, which is described above as useful in the method of the invention. This foam control agent control composition may be added to agents, such as carboxy methyl cellulose (CMC), brighteners, chelating agents, such as ethylene diamine tetraacetic acid (EDTA) and nitrilotriacetic acid (NTA), enzymes and bacteriostats. Materials suitable for the detergent component are well known to the person skilled in the art and are described in many text books, for example Synthetic Detergents, A. Davidsohn and B. M. Milwidsky, 6th edition, George Godwin (1978).

Foam control compositions which are described above as useful in the method of the present invention may be mixed in with the other ingredients of the detergent composition in any suitable way. For example, they may be mixed in mechanically, or sprayed onto the powdered detergent composition. Preferably they are encapsulated or in some other way protected against deterioration. Such encapsulation methods and protection methods are well known and have been described in the literature. They include the use of waxes, water soluble materials, low melting materials and starches.

The foam control agent may be mixed by addition to a surfactant composition, e.g. detergent composition, prior to this being placed in the aqueous solution, or by mixing the appropriate amount of foam control agent into the aqueous solution.

There now follow a number of examples in which all parts and percentages are by weight unless otherwise indicated.

PREPARATION OF FOAM CONTROL AGENTS

An organopolysiloxane (A) was prepared by hydrosilylation reaction of the corresponding hydrosiloxane with the corresponding alkene in the presence of a Pt catalyst. It has the formula

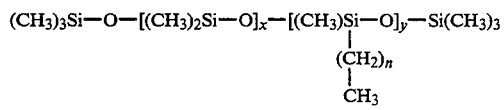

wherein x is 58, y is 40 and n is 17.

One set of foam control agents were prepared by mixing the above organopolysiloxane with a particulate material which was selected from (A) a precipitated silica, treated with polydimethylsiloxane supplied by Degussa GmbH, or (B) a fumed silica treated with hexamethyldisilazane supplied by Cabot Corporation, and with mineral oil supplied by Witco Corporation under the name Kaydol ® and referred to as MO, in the amounts given in Table I. A second set of foam control agents were prepared by mixing the above organopolysiloxane with a commercially available antifoam mixture of mineral oil and silica, sold under the name Balab ® 3056A by Witco Corporation referred to as BA, in amounts given in Table I. Amounts are given in weight %.

TABLE I

| Foam Control Agent | Polyorgano-siloxane | Filler (Type) | Hydrocarbon (Type) |
| --- | --- | --- | --- |
| AF 1 | 5.0 | 5.0 (A) | 90.0 (MO) |
| AF 2 | 10.0 | 5.0 (A) | 85.0 (MO) |
| AF 3 | 20.0 | 5.0 (A) | 75.0 (MO) |
| AF 4 | 50.0 | 5.0 (A) | 45.0 (MO) |
| AF 5 | 75.0 | 5.0 (A) | 20.0 (MO) |
| AF 6 | 90.0 | 5.0 (A) | 5.0 (MO) |
| AF 7 | 5.0 | 2.7 (B) | 92.3 (MO) |
| AF 8 | 10.0 | 2.7 (B) | 87.3 (MO) |
| AF 9 | 20.0 | 2.7 (B) | 77.3 (MO) |
| AF 10 | 42.5 | 5.0 (B) | 42.5 (MO) |
| AF 11 | 50.0 | 5.4 (B) | 44.6 (MO) |
| AF 12 | 90.0 | 5.0 (B) | 5.0 (MO) |
| AF 13 | 10.0 | — | 90.0 (BA) |
| AF 14 | 20.0 | — | 80.0 (BA) |
| AF 15 | 30.0 | — | 70.0 (BA) |
| AF 16 | 50.0 | — | 50.0 (BA) |

Four comparative foam control agents were prepared. CAF1 was a prior art foam control agent, comprising a linear polydimethylsiloxane polymer and 12% by weight of a hydrophobic silica. CAF2 comprises 95% of mineral oil and 5% of silica (A), CAF3 comprises 95% of Kaydol ® and 5% of silica (B) and CAF4 comprises 100% of Balab ® 3056A.

Testing of the Foam Control Agents

Foam control efficiency was tested in a front loading washing machine (Miele ® 427) using a 3.5 kg load of clean cotton pillow cases and a washing cycle of 40° C. As detergent composition was used about 70 g of a composition free from foam control agents of any description based on alkyl benzyl sulphonate, alkyl polyethylene oxide, sodium tripolyphosphate and sodium perborate. The foam control efficiency was related to the amount of foam generated during the washing cycle and is expressed by the amount of foam control required (as a percentage by weight of the detergent composition) required to keep the foam level below the 100% mark of the window of the machine, when the drum is stationary. The results are given in Table II.

TABLE II

| Foam Control Agent | Required Level |
| --- | --- |
| AF 1 | 0.50 |
| AF 2 | 0.50 |

TABLE II-continued

| Foam Control Agent | Required Level |
| --- | --- |
| AF 3 | 0.45 |
| AF 4 | 0.25 |
| AF 5 | 0.15 |
| AF 6 | 0.10 |
| AF 7 | 0.75 |
| AF 8 | 0.70 |
| AF 9 | 0.60 |
| AF 10 | 0.45 |
| AF 11 | 0.45 |
| AF 12 | 0.20 |
| AF 13 | 1.40 |
| AF 14 | 1.00 |
| AF 15 | 0.50 |
| AF 16 | 0.40 |
| CAF 1 | 0.50 |
| CAF 2 | 0.70 |
| CAF 3 | 0.75 |
| CAF 4 | >2.0 |

From Table II it is clear that the foam control agents suitable for use in the method of the invention perform better than those foam control agents which are based on hydrocarbon oils only. It also shows that foam control agents suitable for use in the method of the invention perform better than standard foam control agents based on polydiorganosiloxanes, provided at least 50% of the liquid component of the composition is based on the organopolysiloxanes having higher alkyl silicon-bonded substituents.

Alternative Testing of Foam Control Agents

A 200 ml glass bottle was filled with 100 ml of an aqueous solution containing 0.11 g of alkyl benzene sulphonate and 0.02 g of an alkyl polyethyleneoxide surfactant and a small amount of a foam control agent, as specified in Table III. The bottle was placed in a Vibromatic ® instrument at 40 U/min and shaken mechanically for 2 hours. At regular intervals the instrument was halted to read the amount of foam generated. Results are given in ml foam generated in Table III.

TABLE III

| Foam Control Agent (amount ppm) | FOAM PRODUCED (in ml) Time (min): | | | | | | | |
| --- | --- | --- | --- | --- | --- | --- | --- | --- |
| | 10 | 20 | 30 | 40 | 50 | 60 | 90 | 120 |
| AF 13 (600) | 25 | 25 | 50 | 50 | 55 | 60 | 95 | 95 |
| AF 14 (600) | 20 | 25 | 30 | 25 | 35 | 35 | 50 | 50 |
| AF 15 (600) | 20 | 25 | 25 | 25 | 25 | 20 | 25 | 25 |
| AF 15 (200) | 45 | 50 | 50 | 60 | 70 | 75 | 50 | — |
| AF 16 (200) | 25 | 25 | 25 | 25 | 25 | 25 | 25 | 25 |
| CAF 4 (600) | 30 | 40 | 50 | 55 | 60 | 70 | 95 | 95 |

As can be seen from Table III foam control agents suitable for use in the method of the invention perform better than those based purely on hydrocarbon oil.

That which is claimed is:

1. A method of controlling foam levels of aqueous surfactant compositions in an environment with free surface turbulence, which comprises adding to the aqueous surfactant composition a foam control agent, which comprises (A) from 5 to 90 parts by weight of an organopolysiloxane of which the siloxane units consist essentially for 0 to 60% of units of the general formula (i)

$$R_a SiO_{\frac{4-a}{2}}$$

wherein R denotes a hydrocarbon group having up to 8 carbon atoms and a has a value of from 0 to 3, and for 40 to 100% of units of the general formula (ii)

$$R_b R_c'' SiO_{\frac{4-b-c}{2}}$$

wherein R'' denotes a group $-Z_z-R'$, wherein R' denotes an alkyl group having from 9 to 35 carbon atoms, Z denotes a linking group between silicon and R' and z has a value of 0 or 1, b has a value of 0, 1 or 2, c has a value of 1 or 2, and b+c has a value of 1, 2 or 3, provided more than 70% by weight of the carbon content of the organopolysiloxane is due to the groups R'', (B) from 0.1 to 30 parts by weight of a finely divided hydrophobic particulate material, (C) from 5 to 95 parts by weight of a hydrocarbon oil and (D) from 0 to 20 parts by weight of an organosilicon resin consisting essentially of triorganosiloxane groups and $SiO_{4/2}$ groups.

2. A method according to claim 1 wherein the organopolysiloxanes are polydiorganosiloxanes with the general structure $$R_b R^*_c Si-O-[RR''Si-O]_x-(R)_2Si-O]_y-SiR_b R^*_c$$

wherein R and R'' are as defined above, R° is selected from R groups and R'' groups, b and c are as defined above, and x and y each independently denote an integer.

3. A method according to claim 2 wherein the total chain length (x+y+2) includes from 40 to 500 siloxane units.

4. A method according to claim 1 wherein R' groups have a carbon chain of from 10 to 24 atoms.

5. A method according to claim 1 wherein Component (B) is silica, having an average particle size of from 0.1 to 50 μ and a surface area of at least 50 m²/g, said surface having been rendered hydrophobic.

6. A method according to claim 1 wherein the ratio by weight of Component (A) over Component (C) is from 1/1 to 20/1.

7. A method according to claim 1 wherein Component (D) is present in an amount of from 5 to 10 parts by weight.

8. A method according to claim 1 wherein Component (A) is present in an amount of from 50 to 90 parts, Component (B) from 2 to 10 parts, Component (C) from 5 to 50 parts and Component (D), when present from 1 to 5 parts by weight.

9. A detergent composition in powder form comprising a detergent component and a foam control agent comprising (A) from 5 to 90 parts by weight of an organopolysiloxane of which the siloxane units consist essentially for 0 to 60% of units of the general formula (i)

$$R_a SiO_{\frac{4-a}{2}}$$

wherein R denotes a hydrocarbon group having up to 8 carbon atoms and a has a value of from 0 to 3, and for 40 to 100% of units of the general formula (ii)

$$R_b R_c'' SiO_{\frac{4-b-c}{2}}$$

wherein R″ denotes a group —$Z_z$—R′, wherein R′ denotes an alkyl group having from 9 to 35 carbon atoms, Z denotes a linking group between silicon and R′ and z has a value of 0 or 1, b has a value of 0, 1 or 2, c has a value of 1 or 2, and b+c has a value of 1, 2 or 3, provided more than 70% by weight of the carbon content of the organopolysiloxane is due to the groups R″, (B) from 0.1 to 30 parts by weight of a finely divided hydrophobic particulate material, (C) from 5 to 95 parts by weight of a hydrocarbon oil and (D) from 0 to 20 parts by weight of an organosilicon resin consisting essentially of triorganosiloxane groups and $SiO_{4/2}$ groups.

10. A detergent composition according to claim 9 wherein the foam control agent is present in an amount of from 0.02 to 25% by weight based on the total detergent composition.

11. A composition according to claim 9 wherein the organopolysiloxanes are polydiorganosiloxanes with the general structure

wherein R and R″ are as defined above, R° is selected from R groups and R″ groups, b and c are as defined above, and x and y each independently denote an integer.

12. A composition according to claim 9 wherein the total chain length (x+y+2) includes from 40 to 500 siloxane units.

13. A composition according to claim 9 wherein R′ groups have a carbon chain of from 10 to 24 atoms.

14. A composition according to claim 9 wherein Component (B) is silica, having an average particle size of from 0.1 to 50 μ and a surface area of at least 50 m²/g, said surface having been rendered hydrophobic.

15. A composition according to claim 9 wherein the ratio by weight of Component (A) over Component (C) is from 1/1 to 20/1.

16. A composition according to claim 9 wherein Component (D) is present in an amount of from 5 to 10 parts by weight.

17. A composition according to claim 9 wherein Component (A) is present in an amount of from 50 to 90 parts, Component (B) from 2 to 10 parts, Component (C) from 5 to 50 parts and Component (D), when present from 1 to 5 parts by weight.

* * * * *